United States Patent [19]
Trozera

[11] 3,994,161
[45] Nov. 30, 1976

[54] LOAD CELL

[76] Inventor: Thomas A. Trozera, 437 Pine Needles Drive, Del Mar, Calif. 92014

[22] Filed: June 11, 1975

[21] Appl. No.: 585,786

[52] U.S. Cl. .................... 73/141 A; 177/211
[51] Int. Cl.² ............................. G01L 1/22
[58] Field of Search .......... 73/141 A; 338/5; 177/211

[56] References Cited
UNITED STATES PATENTS

| | | | |
|---|---|---|---|
| 2,472,047 | 5/1949 | Ruge | 73/141 A |
| 2,822,095 | 2/1958 | Buckingham | 73/141 A X |
| 3,063,576 | 11/1962 | Hofmeister | 177/211 X |
| 3,082,621 | 3/1963 | Soderholm | 73/88 R |
| 3,184,964 | 5/1965 | Hedrick et al. | 73/141 A |
| 3,224,519 | 12/1965 | Fletcher et al. | 73/141 A X |
| 3,371,526 | 3/1968 | Fathauer | 73/141 A |
| 3,554,026 | 1/1971 | Seed | 73/141 A |
| 3,805,604 | 4/1974 | Ormond | 73/141 A |

*Primary Examiner*—Charles A. Ruehl
*Attorney, Agent, or Firm*—Lindenberg, Freilich, Wasserman, Rosen & Fernandez

[57] ABSTRACT

A load cell which includes a moveable load-receiving member coupled to a support member by three parallel bands, and having strain gauges connected to the middle band, so that the strain gauges are largely unaffected by off-center application of loads. In one load cell, the ends of all bands are connected in a cantilever connection to the support and load-receiving members, except for one end of the middle band which is pivotally connected to one of the members, this resulting in even less sensitivity to off-center loading.

4 Claims, 6 Drawing Figures

LOAD CELL

BACKGROUND OF THE INVENTION

This invention relates to load cells and to scales and other apparatus utilizing load cells.

One type of load cell includes a load-receiving member connected by a pair of spaced bands to a support member, the ends of each band being connected in a cantilever fashion to its respective member. A strain gauge connected to any of the bands, undergoes a change in resistance proportional to deflection of the band and therefore proportional to the load applied to the load-receiving member. A Wheatstone bridge or other resistance measuring device connected to the strain gauge can accurately indicate the load on the load cell. If care is taken to apply the load along the axis of the load-receiving member, such scales can provide accuracies of well within 0.1% of full scale, which is often used as a criteria by government agencies in certifying the scale for commercial use. However, if the load is applied even a small distance away from the axis of the load-receiving member, then the accuracy of the scale greatly decreases. For example, a load cell may have a linearity of 0.05% of full scale for on-center loads, but the linearity may decrease to 0.25% for loads applied at an angle of 3° with respect to the axis of the load-receiving member. Linkages have been utilized to assure on-axis loading of load cells, but these linkages are relatively expensive and add considerably to the cost and complexity of scales that utilize load cells. A load cell of high accuracy, which was largely insensitive to off-axis loading, would permit the construction of scales and other load-measuring instruments at a significantly lower cost.

SUMMARY OF THE INVENTION

In accordance with one embodiment of the present invention, a load cell is provided which retains its accuracy in spite of substantial misalignment of the center of gravity of a load with the axis of movement of a load-receiving member. The load cell includes a fixed supporting member, a movable load-receiving member, and three parallel band-shaped bending elements extending parallel to one another and having opposite ends respectively connected to the supporting member and load-receiving member. The middle bending element is located halfway between the other bending elements, and strain gauges are coupled to the middle bending element to measure deformations thereof. If a load is applied off-center to the load-receiving member, so as to introduce a torque to the load cell, the torque may be resisted by additional tension in one outer bending element and additional compression in another bending element, but the middle bending element will be affected to only a small degree.

In an embodiment of the invention which is especially insensitive to sideward off-loading, one end of the middle bending element is pivotally connected to one of the members such as the load-receiving member. The other end of the middle bending element, as well as both ends of the outer bending elements, are connected in rigid cantilelver joints to their respective members. The pivotal joint results in the middle member undergoing substantially no twisting when a sideward off-loading is encountered which twists the outer bending elements.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
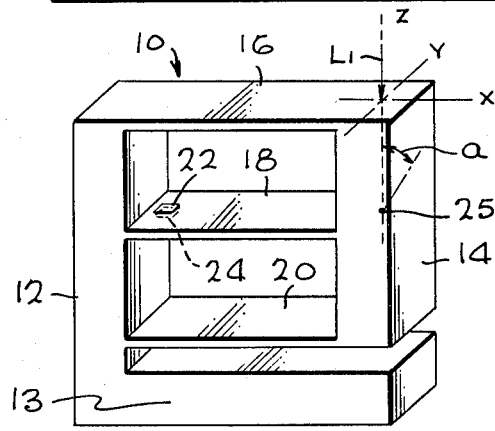
FIG. 1 is a perspective view of a load cell constructed in accordance with one embodiment of the present invention.

FIG. 1 illustrates a load cell 10 which includes a vertically-extending support member 12 with a bottom leg 13 that normally rests on a stationary horizontal surface, a vertically extending load-receiving member 14, and three parallel and horizontally extending bands or bending elements 16, 18, and 20 which connect the supporting and load-receiving members 12, 14. The two members 12, 14, which may be referred to as holding members, serve to hold the ends of the band-shaped resilient bending elements 16–20 in a cantilever or non-pivoting joint. As a result, when there is no load on the load-receiving member 14, the bands extend substantially straight. When a load is applied to the load-receiving member 14, the bands 16–20 bend in an amount proportional to the load, within a limited range of loading. A pair of strain gauges 22, 24 are applied to opposite faces of the middle band 18 to permit a measurement of the amount of bending of the load cell. The strain gauges 22, 24 are of the common type which undergoes a change in resistance proportional to its elongation or compression. A Wheatstone bridge or other accurate resistance-measuring device is connected to the strain gauges to measure the change in resistance, all in a well known manner, to thereby measure deflection of the middle band 18 and therefore to indicate the amount of load on the load-receiving member 14.

The magnitude of a load $L_1$ applied to the load-receiving member 14 could be determined by the use of a strain gauge applied to either of the outer bending elements such as upper element 16 or lower element 20. In that case, there would be no need for the middle bending element 18. However, a strain gauge applied to one of the outer elements such as 16 would provide accurate measurements of a load such as $L_1$ only if it were applied along the vertical or loading axis Z of the load cell. If a load were applied away from the loading axis Z, such as along the X- or Y-axis, then a strain gauge mounted on element 16 would give an erroneous reading. This can be understood if a load $L_2$ is considered which is applied along the X-axis, but at a distance $d$ from the preferred axis of loading Z of the cell. The load $L_2$ can be divided into an equivalent axial force F and a torque T equal to F multiplied by $d$. The force F itself would produce the correct reading. The torque T, which tends to create rotation about a center of rotation 25, produces an increased tensile stress in the upper bending element 16 and an increased compression in the lower bending element 20, so that any elongation or compression measured by a strain gauge attached to one of the elements 16 or 20 would include a component due to the torque T and therefore would be in error. By including a middle bending element 18 located halfway between the outer bending elements 16, 20, and by attaching the strain gauges thereto, the effect of torque T is greatly reduced. This is because the outer elements 16, 20 resist the torque so that the middle bending element is largely unaffected.

Figure 2:
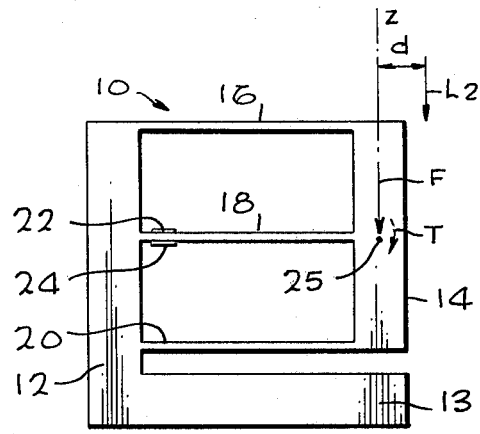
FIG. 2 is a front elevation view of the load cell of FIG. 1.

In load cells containing only two bending elements such as 16 and 20 and with strain gauges applied to one of them, an accuracy of about 0.05% can be obtained for on-center loads. An off-center load is often measured in terms of its equivalent angle of off-setting as indicated at $a$, and for a typical load cell with only two bending elements 16, 20 an accuracy of only about 0.25% of full scale is obtainable with loads offset in any direction at an equivalent angle of 3° from the load axis Z. In load cells constructed in the manner shown in FIGS. 1 and 2, an accuracy or linearity of better than 0.05% was maintained over an offset angle of up to 13° along the X-axis, with the error increasing to only 0.15% at an equivalent offset angle of 26° along the X-axis. The nonlinearity was affected to a greater extent for offset angles along the Y-axis, but was still better than has been attainable with prior art load cells.

Figure 3:
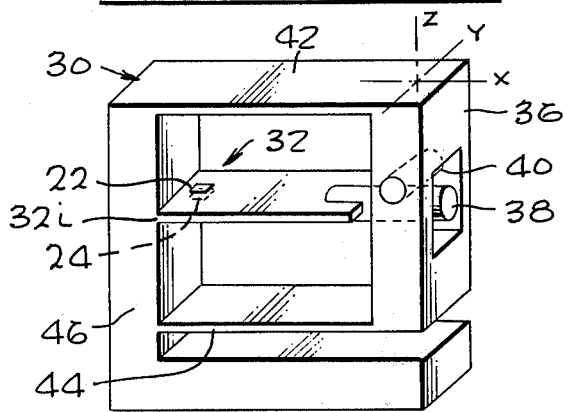
FIG. 3 is a perspective view of a load cell constructed in accordance with another embodiment of the invention.
Figure 4:
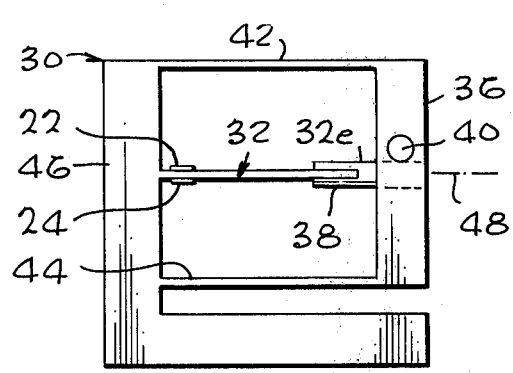
FIG. 4 is a front elevation view of the load cell of FIG. 3.
Figure 5:
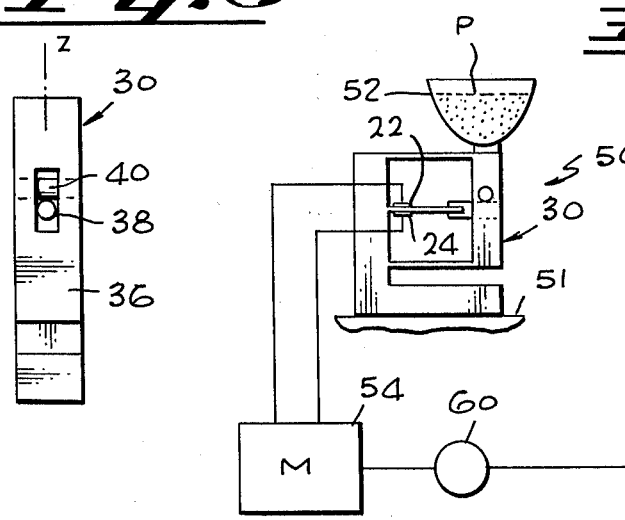
FIG. 5 is a side elevation view of the load cell of FIG. 4.

FIGS. 3 – 5 illustrate another load cell 30 which is similar to the load cell 10 except that its middle bending element 32 has an outer end 32e which is mounted in a pivotal joint instead of a non-pivoting or centilever joint, on a load-receiving member 36. This is accomplished by the use of a pair of small cylindrical rolls or pins 38, 40, one pin 38 being fixed to the outer end 32e of the middle bending element, and the other pin 40 being fixed to the load-receiving member 36. The two rolls or pins 38, 40 extend perpendicular to one another and their cylindrical surfaces bear on one another. A major advantage of this joint at the outer end 32e of the middle bending element, is that the element does not twist when a load is applied off-center along the Y-axis. A load applied off-center along the Y-axis causes the upper and lower bending elements 42, 44 to undergo twisting and to therefore allow pivoting of the load-receiving member 36 so that its axis Z tilts. However, when the member 36 and the pin 40 thereon tilt, the pin 40 merely rolls slightly on the other pin 38 in a low friction largely pivoting action. The net result is that substantially no torque is transmitted to the middle bending element 32 and it bends only in an up or down direction in proportion to the load. The inner end 32i of the middle bending element is mounted on a supporting member 46 in a cantilever joint. It may be noted that the middle bending element may be pivotally mounted to either of the holding members 36, 46 to avoid twisting of the element. Also, a variety of joints may be utilized such as knife edge pivots, that permit pivoting about a longitudinal axis 48 of one end of the middle bending element.

The load cell 30 includes a pair of strain gauges 22, 24 attached to the inner end of the middle bending element 32. It may be noted that the sensitivity of the load cell 30 is not quite as great as that of the earlier-described load cell 10, because the use of a pivotal joint instead of a non-pivoting or cantilever joint at one end of the middle bending element results in less severe bending where the strain gauges 22, 24 are located. However, this decreased sensitivity does not have a major effect on the sensitivity of an entire scale which utilizes a load cell, inasmuch as devices for measuring the resistance changes of the strain gauges are available which are extremely sensitive, so the linearity of the load cell is the major limiting factor in determining sensitivity. It also may be noted that the linearity for off-loading along the X-axis is not significantly different for the load cell 30 as compared to the load cell 10 of FIGS. 1 and 2, both load cells being highly linear for off-loading along the X-axis.

Thus, the load cell 30 has high linearity for off-loading along both the X- and Y-axes, and permits the construction of a relatively simple scale or other load-measuring instrument which is accurate in normal use where the load may not be applied along the preferred loading axis. A load cell constructed as shown in FIGS. 3 – 5, has been found to provide a linearity of 0.003% of full scale for off-loading of up to 8° in any direction. The linearity did not exceed 0.01% at offsets of up to 12°, and did not exceed 0.05% at offsets of up to 26°.

Figure 6:
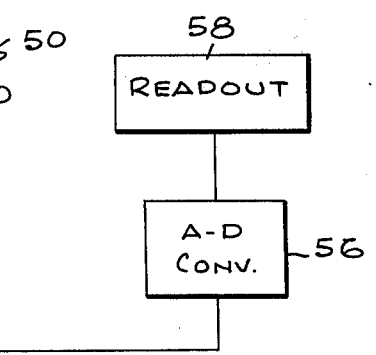
FIG. 6 is a side and partially schematic view of a parts-counting instrument constructed in accordance with the present invention.

FIG. 6 illustrates a parts-counting instrument 50 which utilizes a load cell 30 mounted on a base 51, to accurately count large quantities of small parts. The parts P are held in a bin 52 which tends to keep them centered over the load-receiving member 36. The change in resistance of the strain gauges 22, 24 is measured by a resistance measuring device 54 which may be of the Wheatstone bridge type. The output of the resistance measuring device is applied to an analog-to-digital converter 56 whose output is delivered to a readout device 58. In order to measure a large number of miniature parts, a workman first counts a known number of parts such as 100 and places them in the bin 52. A potentiometer 60 is then adjusted so that the readout device 58 provides a reading of that number. The bin 52 is then filled with progressively greater amounts of parts until the readout device 58 registers the exact number which is the number of parts that are required. It can be appreciated that a load cell of great accuracy is desirable to permit an accurate parts count.

Thus, the invention provides load cells which are of simple construction, and yet which provide great accuracy in spite of application of loads away from the center of the preferred loading axis. A load cell of the type having a pair of outer bending elements cantilevered at each end to a supporting or a load-receiving holding member, is enabled to provide greater linearity by also including a middle bending element positioned halfway between the outer bending elements and by applying strain gauges to the middle element. The linearity of the load cell is further improved, particularly for sideward off-loading or off-loading along the Y-axis, by pivotally coupling one end of the middle bending member to one of the rigid holding members instead of utilizing a cantilever joint.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. A load cell, comprising:

a pair of outer bending elements and a middle bending element, said bending elements extending parallel to one another and to an imaginary X-axis, and with said middle element lying between said outer elements, each of said bending elements having first and second spaced end portions;

a support member coupled to said first end portions of said elements;

a moveable load-receiving member coupled to said second end portions of said elements to move said second end portions when said load-receiving member is moved; and strain gauge means coupled to said middle bending element for measuring bending thereof;

a first pin fixed to a predetermined end of said middle bending element, and a second pin fixed to the member to which said predetermined end of said middle element is coupled, one of said pins extending parallel to said X axis and the other pin extending perpendicular to said first named pin and bearing thereon.

2. A load cell, comprising:

a pair of outer bending elements and a middle bending element, said bending elements spaced from one another along an imaginary Z-axis and extending parallel to one another and to an imaginary X-axis, and with said middle element lying between said outer elements, each of said bending elements having first and second spaced end portions;

a support member coupled to said first end portions of said elements;

a moveable load-receiving member coupled to said second end portions of said elements to move said second end portions when said load-receiving member is moved;

gauge means coupled to said middle bending element for measuring bending thereof;

means coupling a predetermined end of said middle bending element to a corresponding one of said members for preventing their relative movement in one direction along said Z-axis while permitting their relative pivoting about a pivot axis which extends parallel to said X-axis, to thereby prevent twisting of the middle bending element when an off-center load is applied to said load-receiving member, which produces a torque tending to pivot said load-receiving member about a line parallel to said X-axis.

3. A load cell, comprising:

a pair of outer bending elements and a middle bending element, said bending elements extending parallel to one another and to an imaginary X-axis, said middle element lying between said outer elements, each of said bending elements having first and second spaced end portions, and said outer bending elements being spaced from one another along an imaginary Z-axis which is perpendicular to said X-axis;

a support member coupled to said first end portions of said outer elements;

a moveable load-receiving member coupled to said second end portions of said outer elements to move said second end portions when said load-receiving member is moved;

gauge means coupled to said middle bending element for measuring bending thereof;

said first end portion of said middle bending element being coupled to one of said members in a joint that resists relative pivoting; and means for coupling said second end portions of said middle bending element to another of said members in a joint that permits free relative pivoting about both a first pivot axis which extends parallel to said X-axis and a second pivot axis Y which extends perpendicular to both said X-axis and said Z-axis.

4. A load cell, comprising:

a pair of outer bending elements and a middle bending element, said bending elements extending parallel to one another and to an imaginary X-axis, and with said middle element lying between said outer elements, each of said bending elements having first and second spaced end portions;

a support member coupled to said first end portions of said elements;

a moveable load-receiving member coupled to said second end portions of said elements to move said second end portions when said load-receiving member is moved; and a bending-indicating gauge coupled to said middle bending element for measuring bending thereof;

a first pin-like bearing fixed to a predetermined end of said middle bending element, and a second pin-like bearing fixed to the member to which said predetermined end of said middle element is coupled, one of said pin-like bearings extending parallel to said X-axis and the other extending perpendicular to said first named pin-like bearing and bearing thereon.

\* \* \* \* \*